(12) United States Patent  
Tu

(10) Patent No.: US 7,835,148 B2  
(45) Date of Patent: Nov. 16, 2010

(54) PORTABLE STORAGE DEVICE CAPABLE OF BEING DISASSEMBLED EASILY

(75) Inventor: Chih-Kai Tu, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 175 days.

(21) Appl. No.: 12/247,243

(22) Filed: Oct. 8, 2008

(65) Prior Publication Data

US 2009/0296344 A1  Dec. 3, 2009

(30) Foreign Application Priority Data

May 29, 2008  (TW)  ............... 97119869 A

(51) Int. Cl.  
*G06F 1/16* (2006.01)  
*H05K 7/16* (2006.01)  
*H01R 13/62* (2006.01)

(52) U.S. Cl. .................. 361/679.39; 439/327; 439/153; 361/726; 361/727; 361/679.37; 312/332.1; 312/333; 206/701

(58) Field of Classification Search ......... 361/724–727, 361/679.31–679.45, 679.55, 679.58, 683, 361/684, 685, 686, 753, 759, 816, 679.17, 361/679.3; 312/223.1, 223.2; 211/26; 439/157, 439/60, 152–153, 327, 328, 331; 174/383, 174/382; 360/97.01; 165/104.33; 29/37

See application file for complete search history.

(56) References Cited

U.S. PATENT DOCUMENTS

| 7,480,137 | B1 * | 1/2009 | Jyh | ..................... 361/679.33 |
| 2004/0022034 | A1 * | 2/2004 | Coles et al. | ................. 361/726 |
| 2005/0237707 | A1 * | 10/2005 | Connelly et al. | ............ 361/685 |

* cited by examiner

*Primary Examiner*—Zachary M Pape  
*Assistant Examiner*—Jerry Wu  
(74) *Attorney, Agent, or Firm*—Winston Hsu; Scott Margo; Min-Lee Teng

(57) ABSTRACT

A portable storage device includes a storage module whereon a hole is formed, and at least one lateral plate disposed on a lateral side of the storage module. A slot is formed on the lateral plate. The portable storage device further includes a fixture disposed on a front side of the storage module. The fixture includes at least one wedging component for wedging in the slot of the lateral plate, and at least one groove is formed on the fixture. The portable storage device further includes a lock mechanism disposed on a side of the fixture. The lock mechanism includes at least one lock including a protrusion for protruding into the groove on the fixture, and an elastic component connected to the lock for providing an elastic force to the lock so that the protrusion wedges in the groove on the fixture.

27 Claims, 11 Drawing Sheets

PORTABLE STORAGE DEVICE CAPABLE OF BEING DISASSEMBLED EASILY

BACKGROUND OF THE INVENTION

1. Field of the Invention

The present invention relates to a portable storage device capable of being disassembled easily, and more particularly, to a portable electronic device capable of being assembled without screws.

2. Description of the Prior Art

People have to take apart computers when replacing broken components or upgrading instruments inside the computer. So computers capable of being disassembled easily are necessary. It is also inconvenient for users to disassemble a storage device such as a hard disk from a computer.

Please refer to FIG. 1. FIG. 1 is a diagram illustrating assembling a hard disk 15 into a computer 10 in the prior art. The computer 10 includes a housing 11 similar to rectangular shape, a power supply 12 installed on the right rear side inside the housing 11, an optical disk drive fixture 13 installed on the right front side inside the housing 11, and a hard disk fixture 14 installed under the optical disk drive fixture 13 inside the housing 11. The hard disk fixture 14 includes a plurality of fixing holes 17 on both the left and right sides. The hard disk 15 can be placed inside the housing 11 from the front, rear, or top sides of the housing 11. The hard disk 15 includes a plurality of tapped holes 16 on both the left and right sides. The hard disk 15 can be fixed on the hard disk fixture 14 by screwing the tapped holes 16 and the fixing holes 17.

Before users assemble the hard disk 15 from the computer 10, they have to disassemble an optical disk drive first and then loosen screws on both the left and right sides of the hard disk fixture 14. Because the inner space of the computer 10 is limited, it is difficult to disassemble the hard disk 15. Some hard disks are placed inside the housing 11 from the rear side of the housing 11, so that the power supply 12 has to be disassembled before disassembling the hard disk 15. Disassembling the power supply 12 is even more difficult than disassembling the optical disk drive. No matter where the hard disk 15 is placed inside the housing 11, it is difficult to screw the hard disk 15 in using the limited space inside the housing 11.

For solving the above-mentioned problem, there are many kinds of mechanisms of portable storage devices in the market. For example, Taiwan patent no. 1259449 discloses a portable storage device capable of being assembled conveniently. However, it still needs to screw components of the portable storage device resulting in difficulty of assembly and increase of labor hour of assembly.

SUMMARY OF THE INVENTION

According to the claimed invention, a portable storage device includes a storage module whereon a hole is formed, and at least one lateral plate disposed on a lateral side of the storage module. A slot is formed on the lateral plate. The portable storage device further includes a fixture disposed on a front side of the storage module. The fixture includes at least one wedging component for wedging in the slot of the lateral plate, and at least one groove is formed on the fixture. The portable storage device further includes a lock mechanism disposed on a side of the fixture. The lock mechanism includes at least one lock including a protrusion for protruding into the groove on the fixture, and an elastic component connected to the lock for providing an elastic force to the lock so that the protrusion wedges in the groove on the fixture.

According to the claimed invention, a computer system includes a housing, a frame installed inside the housing, and a portable storage device installed inside the frame in a detachable manner. The portable storage device includes a storage module whereon at least one hole is formed, and at least one lateral plate disposed on a lateral side of the storage module. A slot is formed on the lateral plate, and at least one pin is formed on the lateral plate for inserting into the hole. The portable storage device further includes a fixture disposed on a front side of the storage module. The fixture includes at least one wedging component for wedging in the slot of the lateral plate, and at least one groove is formed on the fixture. The portable storage device further includes a lock mechanism disposed on a side of the fixture. The lock mechanism includes at least one lock including a protrusion for protruding into the groove on the fixture, and an elastic component connected to the lock for providing an elastic force to the lock so that the protrusion wedges in the groove on the fixture.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
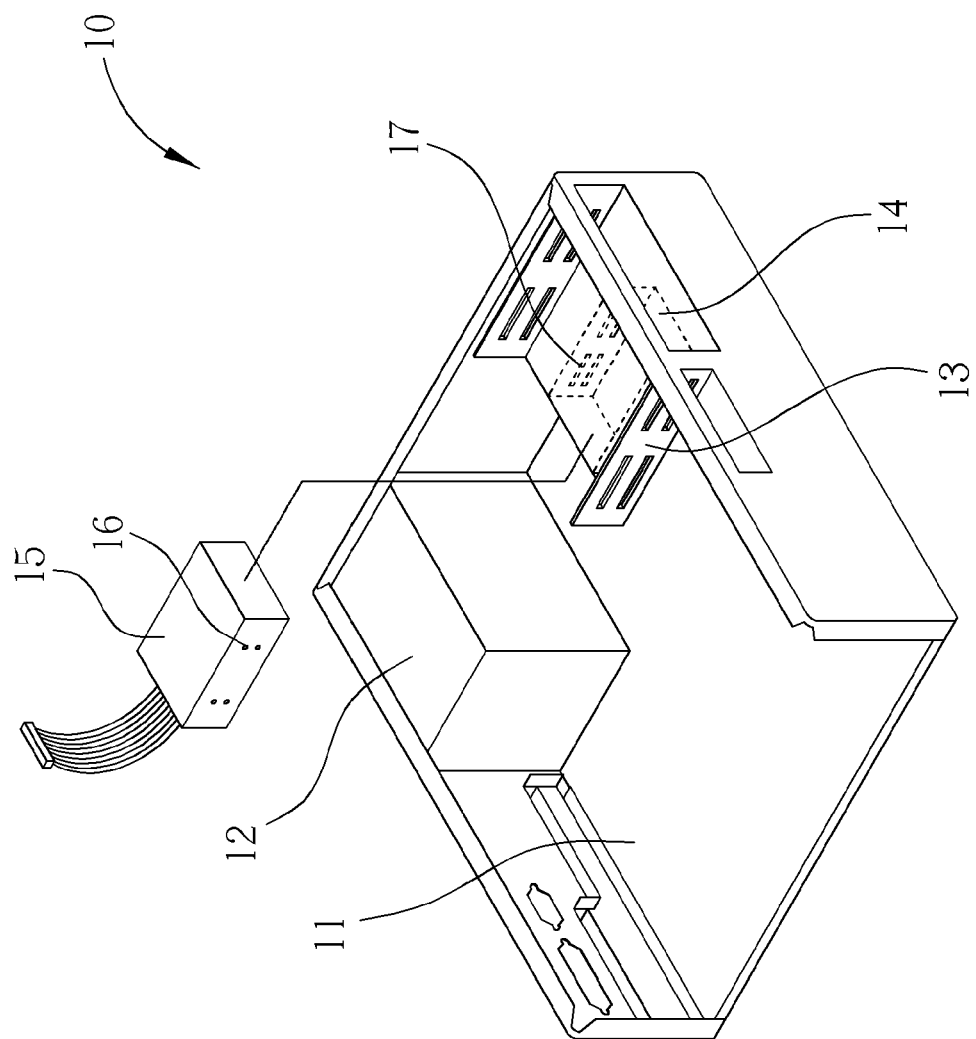
FIG. 1 is a diagram illustrating assembling a hard disk into a computer in the prior art.
Figure 2:
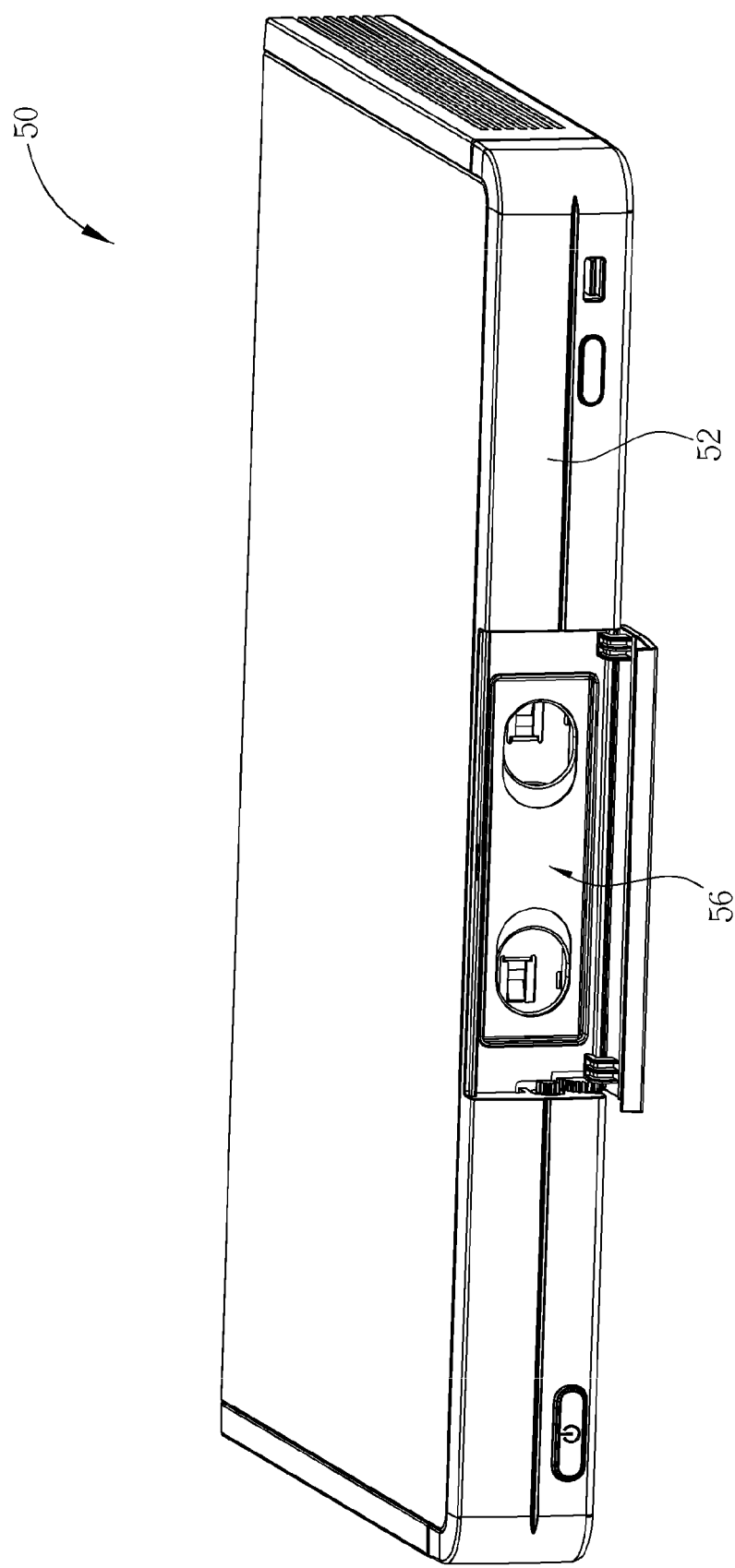
FIG. 2 to FIG. 4 are schematic drawings of a computer system at different conditions according to a preferred embodiment of the present invention.
Figure 3:
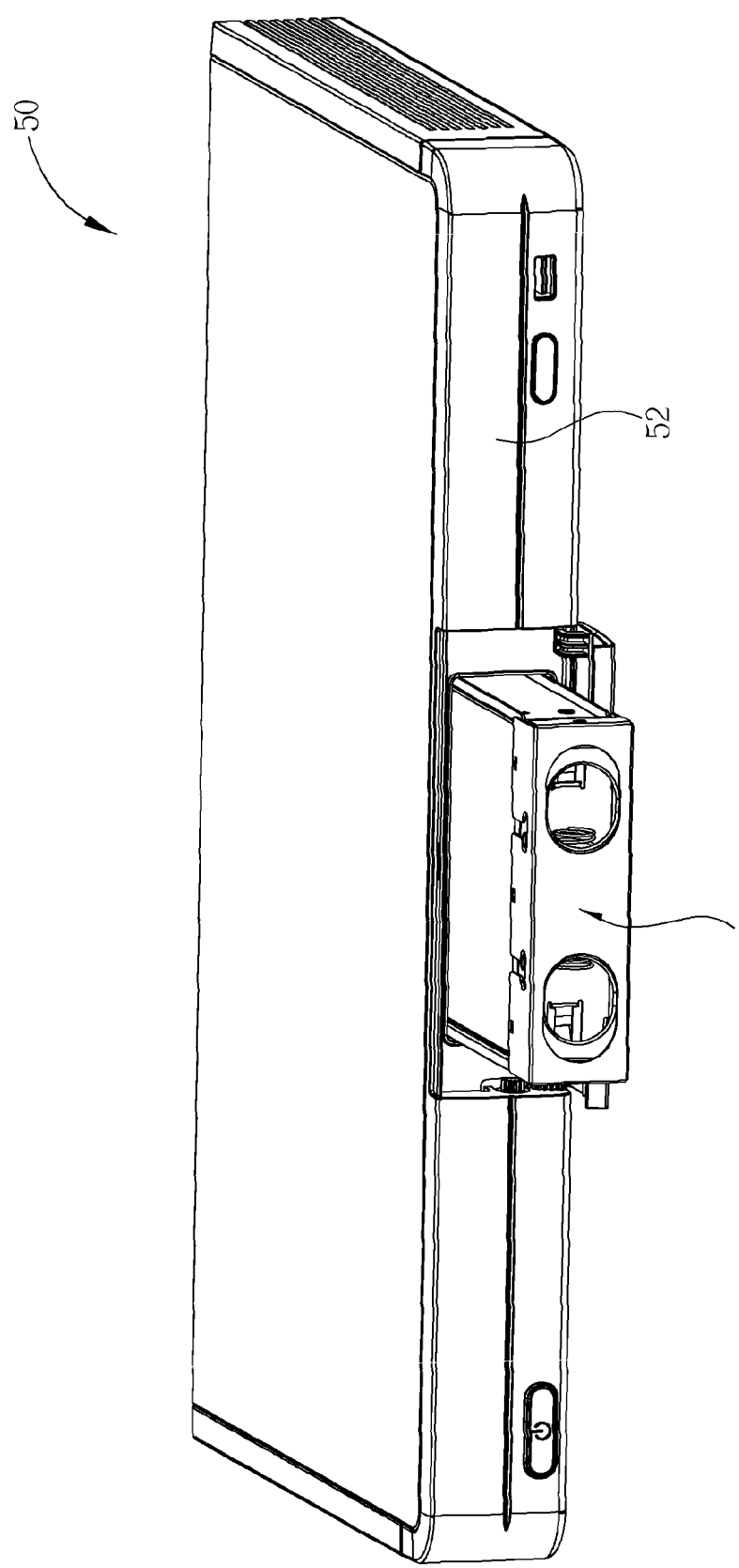
Figure 4:
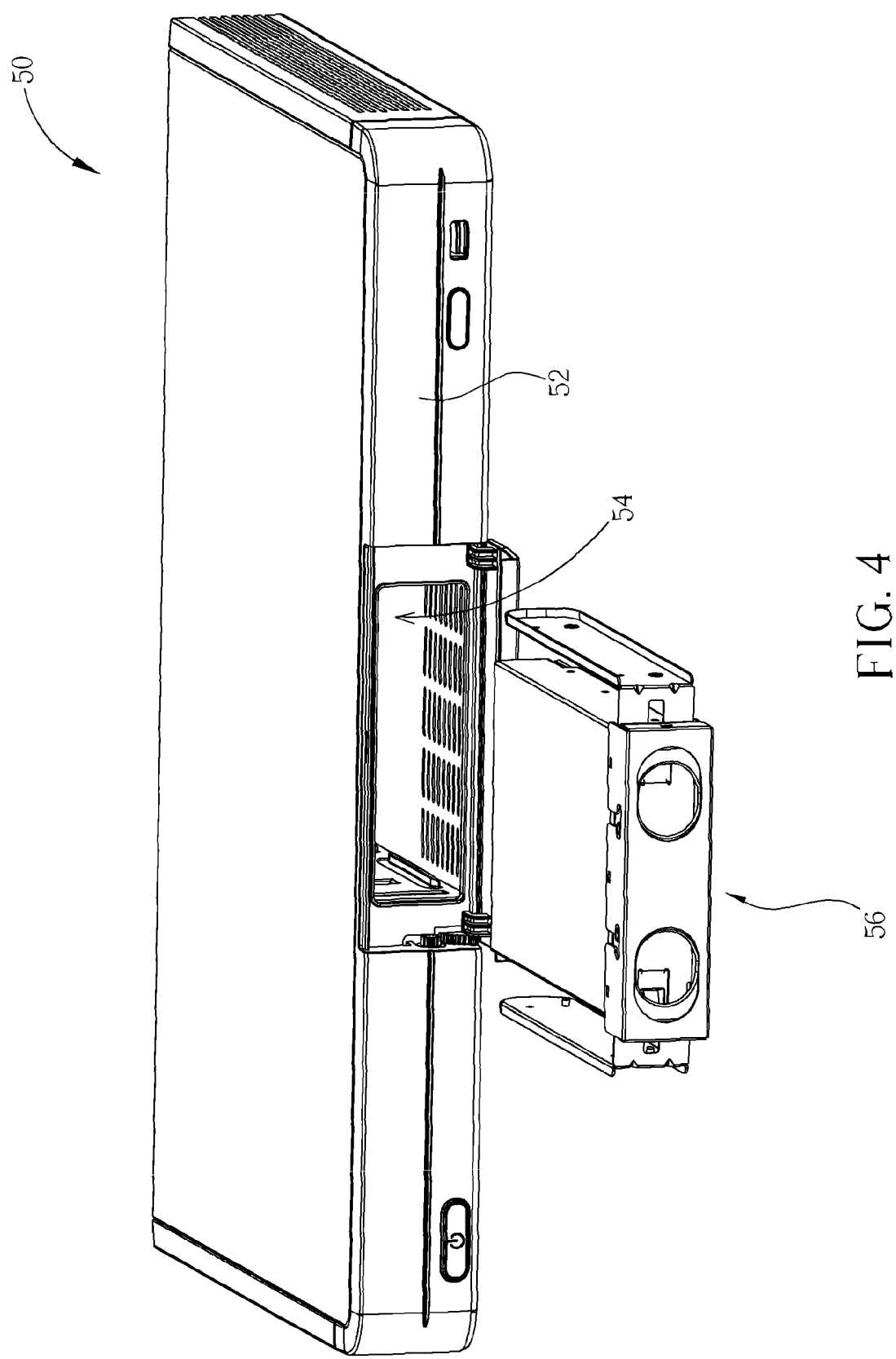

Please refer to FIG. 2 to FIG. 4. FIG. 2 to FIG. 4 are schematic drawings of a computer system 50 at different conditions according to a preferred embodiment of the present invention. The computer system 50 includes a housing 52, a frame 54 installed inside the housing 52, and a portable storage device 56 installed inside the frame in a detachable manner. As shown in FIG. 2, the portable storage device 56 can be contained inside the frame 54 in the housing 52. As shown in FIG. 3, the portable storage device 56 can be drawn out of the frame 54. As shown in FIG. 4, the portable storage device 56 is drawn out of the housing 52 completely.

Figure 5:
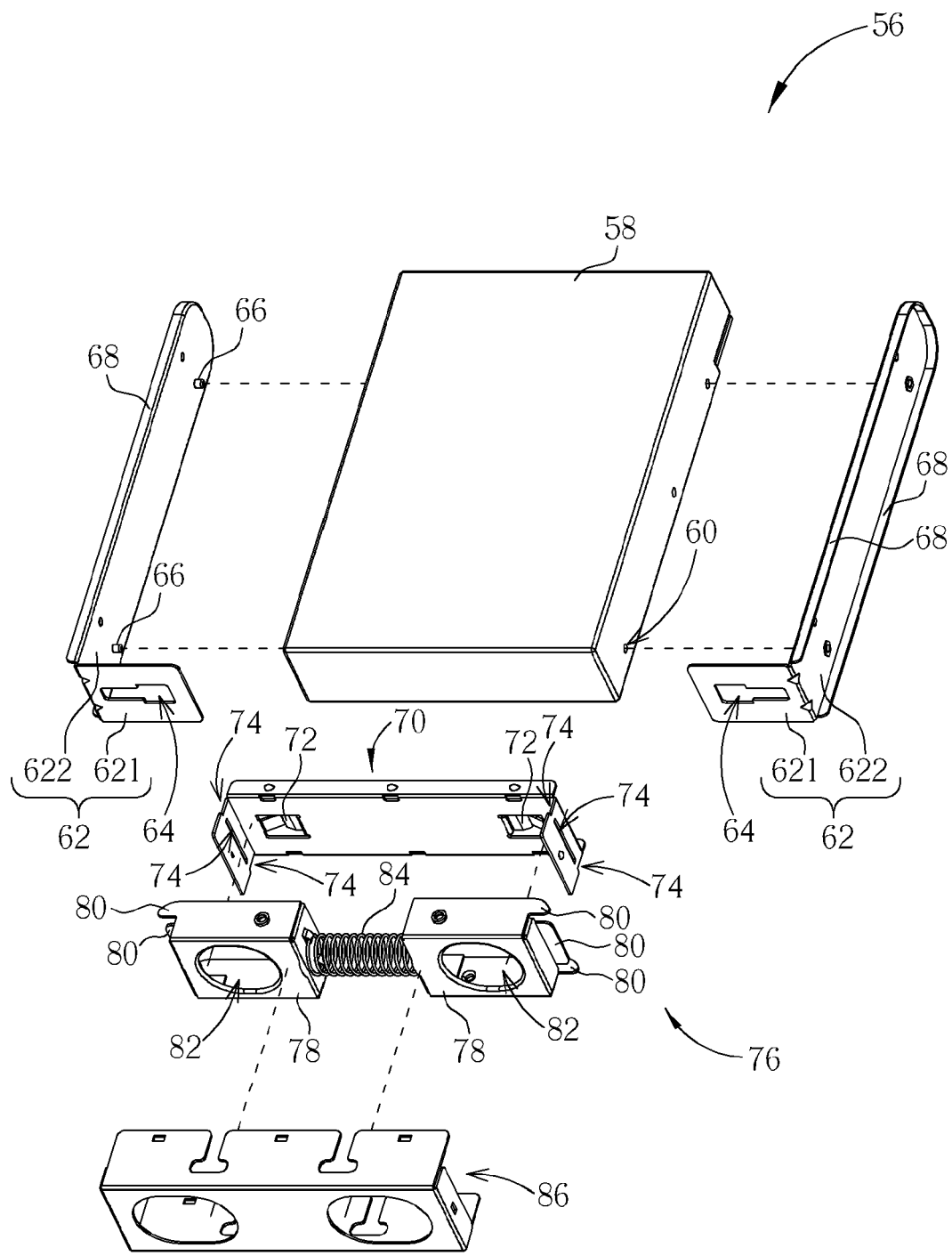
FIG. 5 is an exploded diagram of a portable storage device according to the preferred embodiment of the present invention.

Please refer to FIG. 5. FIG. 5 is an exploded diagram of the portable storage device 56 according to the preferred embodiment of the present invention. The computer system 50 includes a housing 52, a frame 54 installed inside the housing 52, and a portable storage device 56 installed inside the frame in a detachable manner. As shown in FIG. 2, the portable storage device 56 can be contained inside the frame 54 in the housing 52. As shown in FIG. 3, the portable storage device 56 can be drawn out of the frame 54. As shown in FIG. 4, the portable storage device 56 is drawn out of the housing 52 completely. The portable storage device 56 includes a storage module 58 whereon at least one hole 60 is formed. The storage module 58 can be a hard disk, an optical disk drive, or other external storage device. The portable storage device 56 further includes two lateral plates 62 disposed on both lateral sides of the storage module 58. Each lateral plate 62 includes a first lateral wall 621 and a second lateral wall 62. The first lateral wall 621 and the second lateral wall 622 can be perpendicular substantially. The first lateral wall 621 and the second lateral wall 622 can be made of plastic or metal material. A slot 64 is formed on the first lateral wall 621, and at least one pin 66 and at least one rail 68 are disposed on the second lateral wall 662. The pin 66 is for inserting into the hole 60 on the storage module 58 so as to fix the storage module 58 on the lateral wall 62. The portable storage module 56 further includes a fixture 70 disposed on a front side of the storage module 58. The fixture 70 includes two wedging component 72 which can be hooks for wedging in the slots 64 of the lateral plates 62 respectively so as to combine the fixture 70 and the lateral plates 62. At least one groove 74 is formed on the fixture 70. The portable storage device 56 further includes a lock mechanism 76 disposed on a side of the fixture 70. The lock mechanism 76 includes two locks 78 including at least one protrusion 80 respectively for protruding into the groove 74 on the fixture 70 so as to combine the fixture 70 and the lock mechanism 76. At least one aperture 82 is formed on the lock 78. The lock mechanism 76 further includes an elastic component 84 connected to the locks 78 for providing elastic forces to the locks 78 so that the protrusions 80 are capable of wedging in the grooves 74 on the fixture 70. The elastic component 84 can be a spring. The portable storage module 56 further includes a cover 86 disposed on outer side of the lock mechanism 76 for covering the fixture 70 and the lock mechanism 76. A gap can be formed between an inner side of the cover 86 and a surface of the lock 78 so as to prevent the surface of the lock 78 from scraping when the lock 78 moves relative to the cover 86. For example, a dot can be disposed on the inner side of the cover 86 or on the surface of the lock 78 so as to form the gap between the inner side of the cover 86 and the surface of the lock 78.

Figure 6:
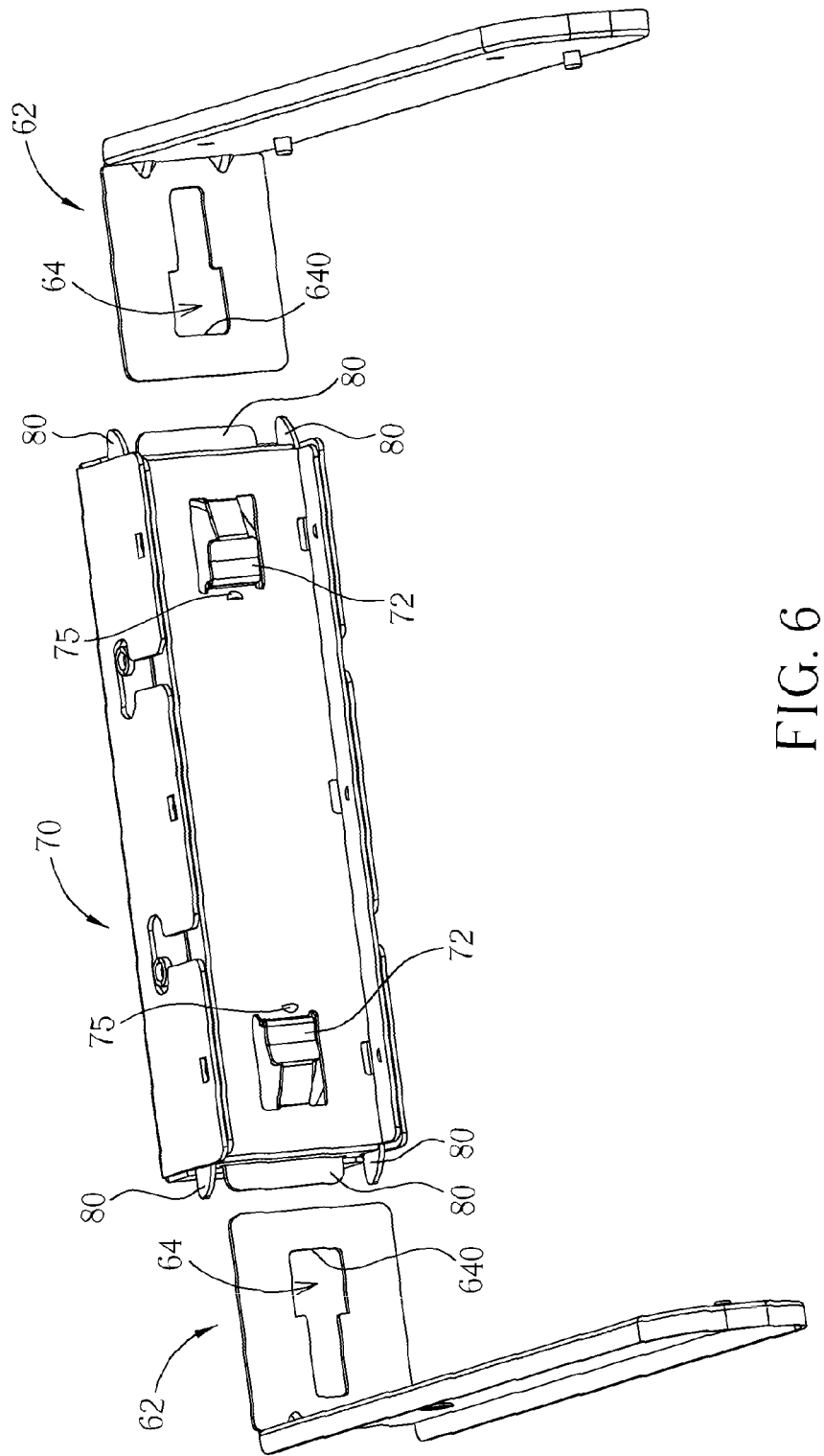
FIG. 6 is a schematic drawing of lateral plates and a fixture having not been assembled according to the preferred embodiment of the present invention.
Figure 7:
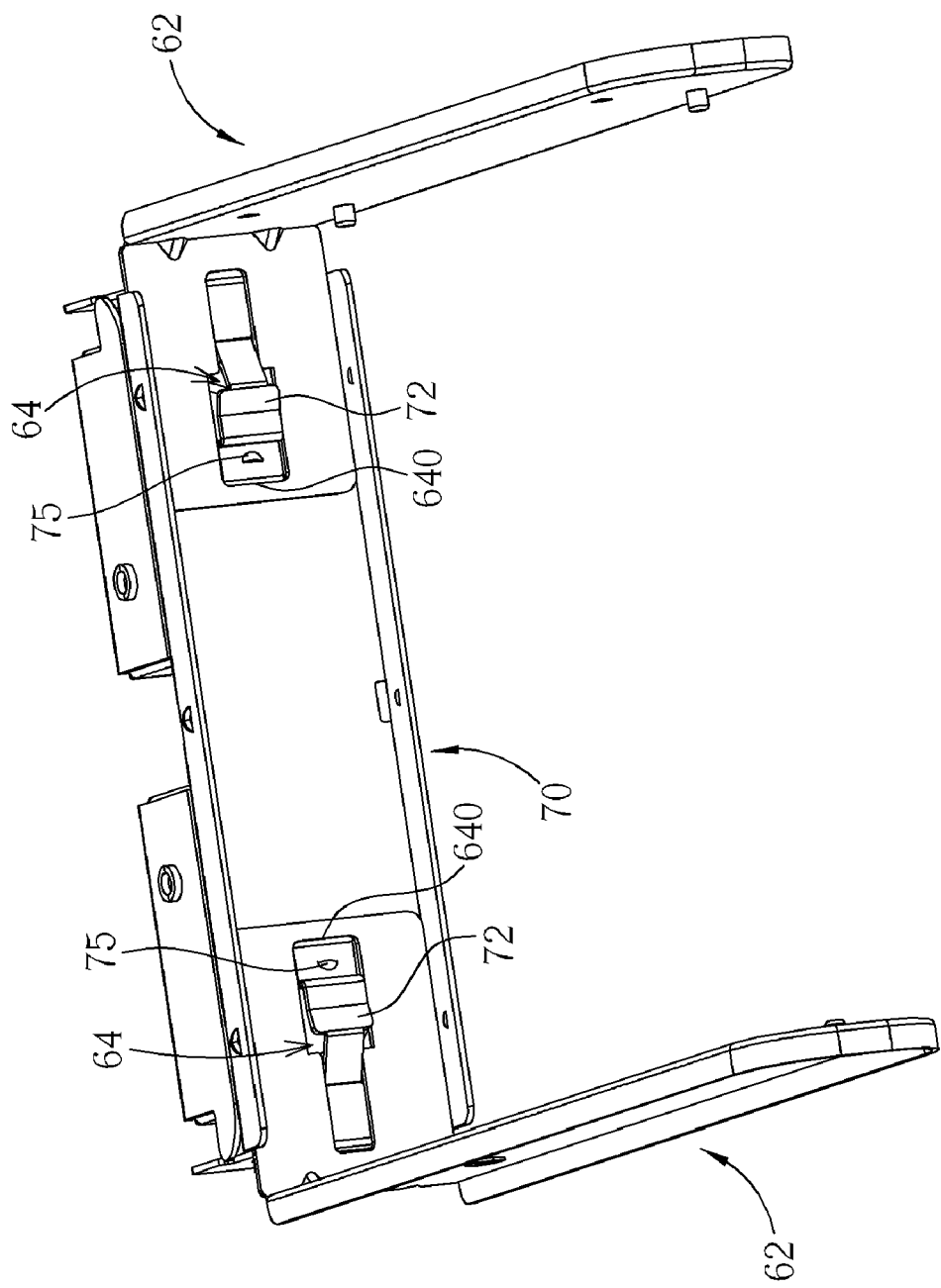
FIG. 7 is a schematic drawing of the lateral plates and the fixture having been assembled according to the preferred embodiment of the present invention.
Figure 8:
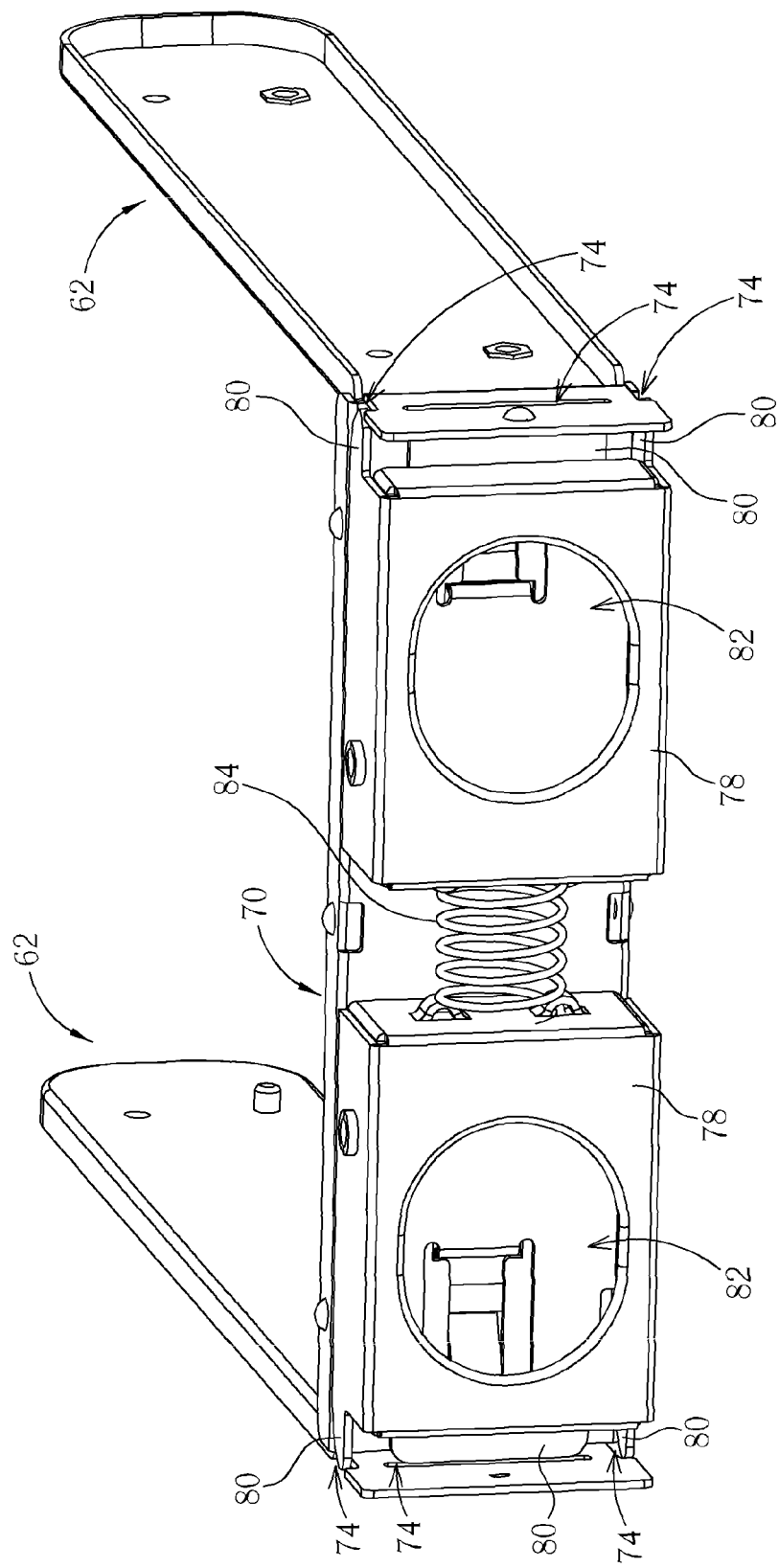
FIG. 8 is a schematic drawing of a lock mechanism assembling with the lateral plates and the fixture according to the preferred embodiment of the present invention.

Please refer to FIG. 6 to FIG. 8. FIG. 6 is a schematic drawing of the lateral plates 62 and the fixture 70 having not been assembled according to the preferred embodiment of the present invention. FIG. 7 is a schematic drawing of the lateral plates 62 and the fixture 70 having been assembled according to the preferred embodiment of the present invention. FIG. 8 is a schematic drawing of the lock mechanism 76 assembling with the lateral plates 62 and the fixture 70 according to the preferred embodiment of the present invention. The two locks 78 can be pushed inwardly so as to compress the elastic component 84 connected to the locks 78. Then the lock mechanism 76 is assembled inside the fixture 70, and the locks 78 are released so that the elastic component 84 restores to an original condition elastically and provides an elastic force to the locks 78 respectively for pushing the locks 78 outwardly. Then the protrusions 80 can be wedged in the grooves 74 on the fixture 70 so as to combine the lock mechanism 76 and the fixture 70. The lateral plates 62 are assembled with the fixture 70 inwardly, and the slots 64 slide to the wedging components 72 of the fixture 70. The wedging component 72 can be wedged inside the slot 64 on the lateral plate 62 for combining the fixture 70 and the lateral plates 62 so that the lock mechanism 76, the lateral plates 62, and the fixture 70 have been assembled completely. Then the storage module 58 can be installed between the two lateral plates 62, and the pins 66 are inserted into the holes 60 on the storage module 58 so as to fix the storage module 58 on the lateral plates. At last, the cover 86 is covered outside the fixture 70, the lock mechanism 76, the lateral plates 62, and the storage module 58.

Figure 9:
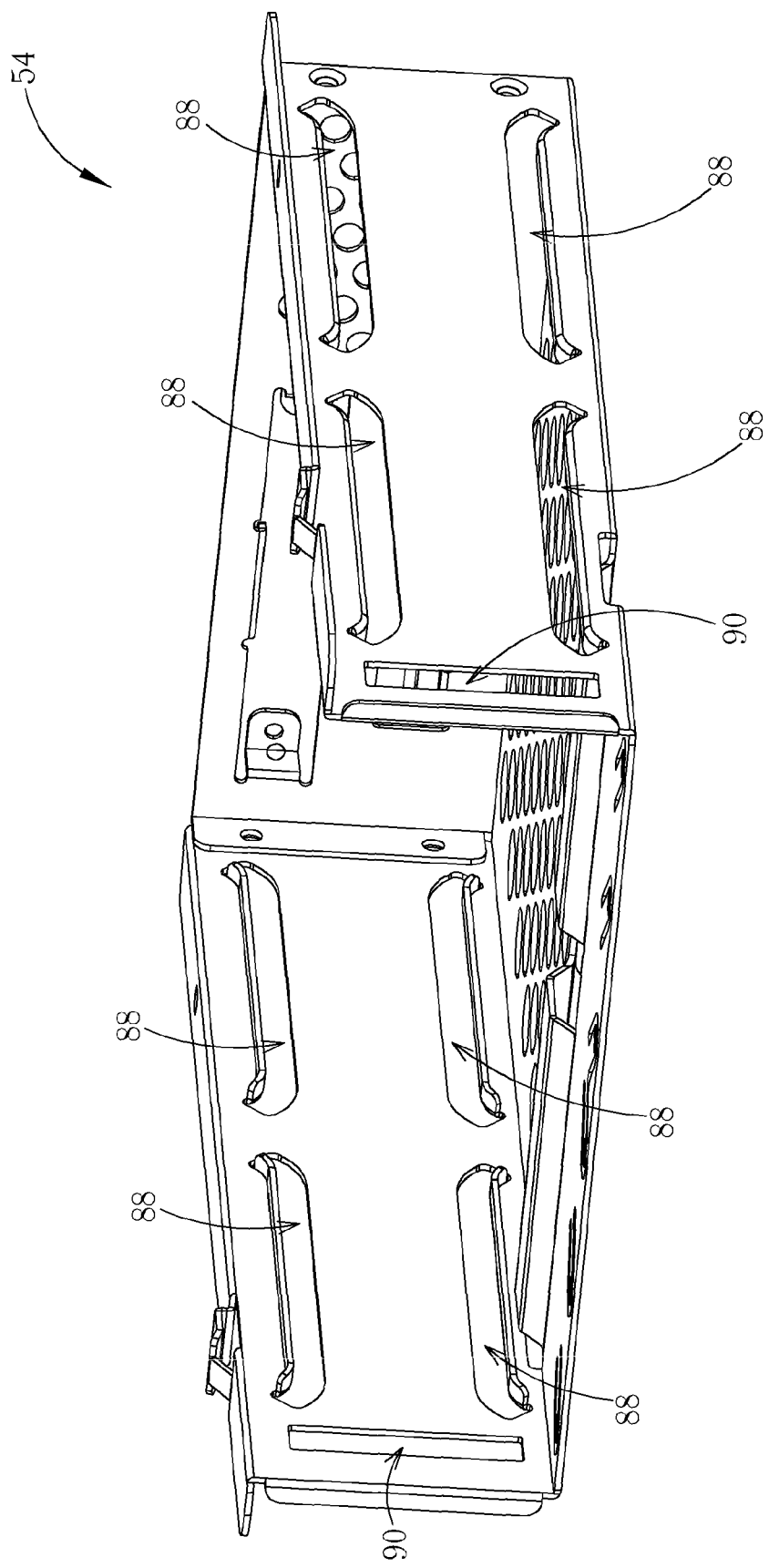
FIG. 9 is a schematic drawing of a frame according to the preferred embodiment of the present invention.
Figure 10:
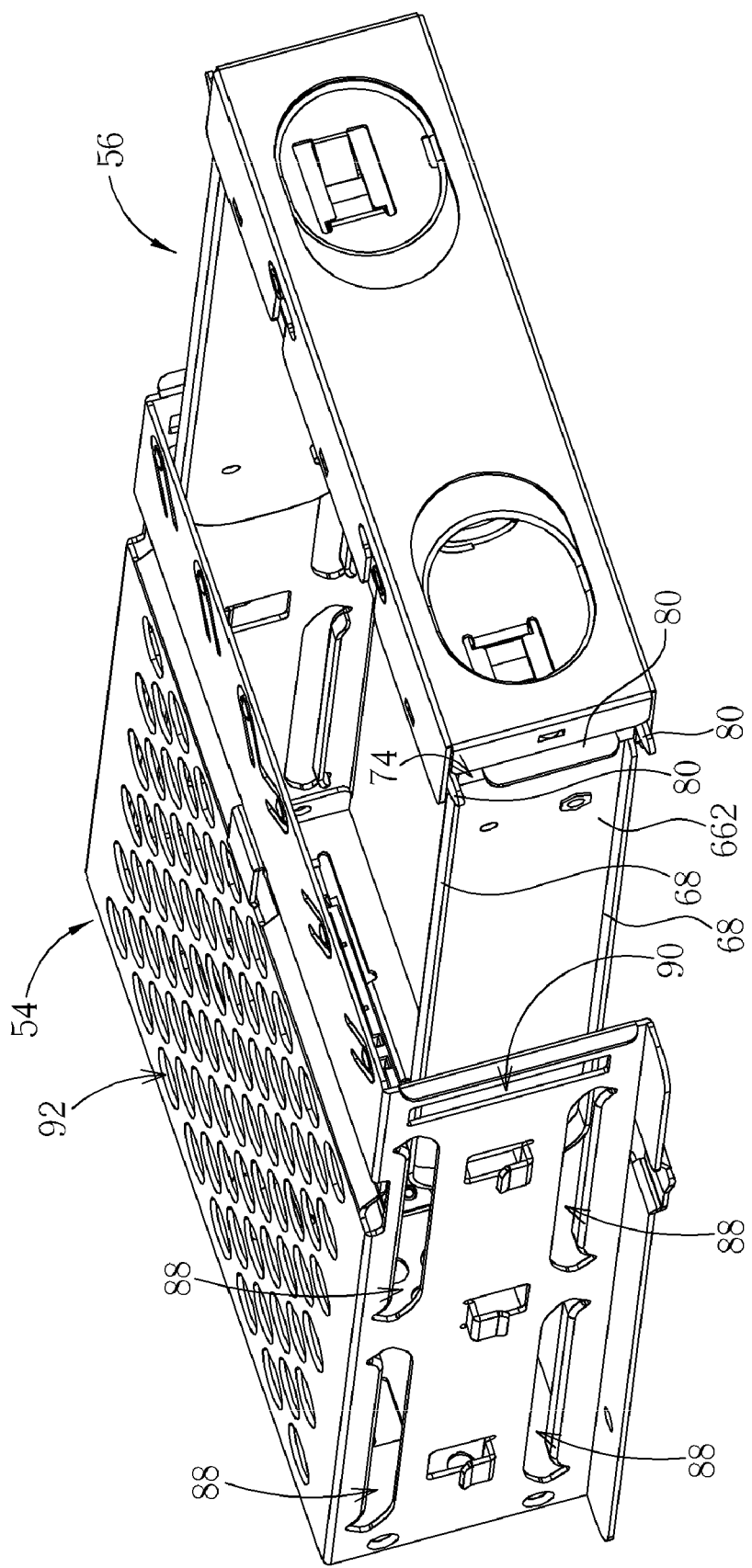
FIG. 10 is a schematic drawing of the portable storage device having been assembled in the frame according to the preferred embodiment of the present invention.
Figure 11:
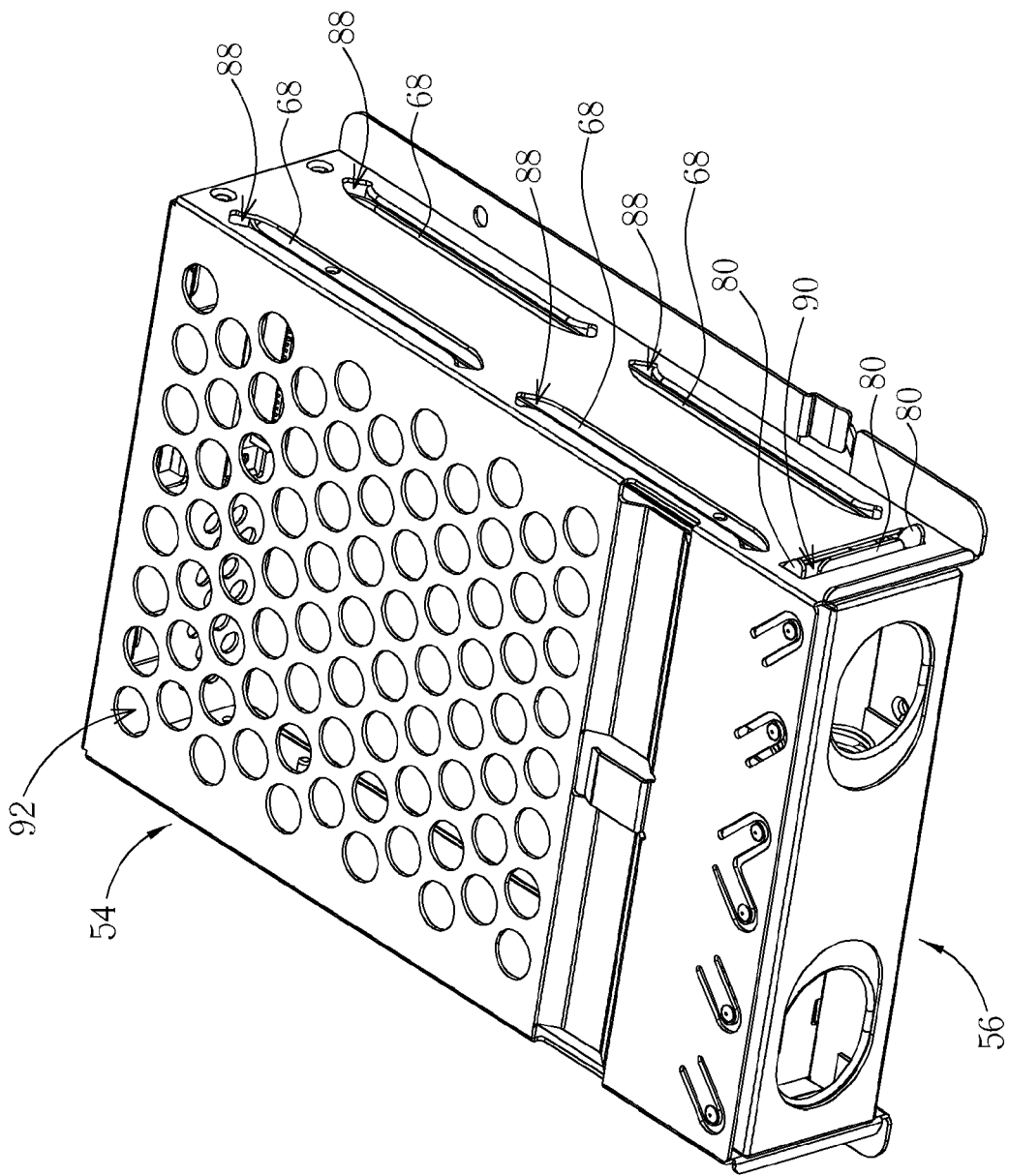
FIG. 11 is a schematic drawing of the portable storage device having been assembled in the frame completely according to the preferred embodiment of the present invention.

Please refer to FIG. 9 to FIG. 11. FIG. 9 is a schematic drawing of the frame 54 according to the preferred embodiment of the present invention. FIG. 10 is a schematic drawing of the portable storage device 56 having been assembled in the frame 54 according to the preferred embodiment of the present invention. FIG. 11 is a schematic drawing of the portable storage device 56 having been assembled in the frame 54 completely according to the preferred embodiment of the present invention. For illustrating structure of the portable storage device 56 and the frame 54 clearly, the part of the housing 52 shielding the frame 54 is omitted. A plurality of guiding slots 88 is formed on the frame 54 for guiding the rail 68 of the second lateral wall 622 to slide. Two openings 90 are formed on the frame 54. When the portable storage device 56 has been installed inside the frame completely, the protrusions 80 of the lock 78 pass through the grooves 74 on the fixture 70 and insert into the openings 90 on the frame 54 so as to fix the portable storage device 56 inside the frame 54. A plurality of heat-dissipating holes 92 is formed on the frame 54 for dissipating heat generated by the storage module 58.

As shown in FIG. 5 to FIG. 7, two dots 75 are formed on the fixture 70 and disposed on a side of the wedging components 72 respectively. The dot 75 is located inside the slot 64 after the first lateral wall 621 is inserted into the fixture 70 and the wedging component 72 wedges the lateral plate 62. There is a gap between the dot 75 and an edge 640 of the slot 64. The dot 75 contacts against the edge 640 of the slot 64 when the lateral plate 62 is drawn out from the fixture 70 outwardly so as to prevent the lateral plate 62 from loosing resulting in fall of the portable storage device 56.

In contrast to the prior art, the portable storage device of the present invention improves problems of inconvenience and increase of labor hour of assembly of the storage module. Especially, the assembly of the present invention is a screwless mechanism so as to reduce difficulty and labor hour of assembling the portable storage device in the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable storage device comprising:
   a storage module whereon a hole is formed;
   at least one lateral plate disposed on a lateral side of the storage module, the lateral plate comprising a first lateral wall and a second lateral wall, and a slot being formed on the first lateral wall;
   a fixture disposed on a front side of the storage module, the fixture comprising at least one wedging component for wedging in the slot of the lateral plate, a dot being formed on a side of the wedging component, the dot being located inside the slot when the first lateral wall is inserted into the fixture, the dot contacting against an edge of the slot when the lateral plate is drawn out from the fixture, and at least one groove being formed on the fixture; and a lock mechanism disposed on a side of the fixture, the lock mechanism comprising:
- at least one lock comprising a protrusion for protruding into the groove on the fixture; and
- an elastic component connected to the lock for providing an elastic force to the lock so that the protrusion wedges in the groove on the fixture.

2. The portable storage device of claim 1 wherein the first lateral wall and the second lateral wall are substantially perpendicular.

3. The portable storage device of claim 1 wherein at least one rail is formed on the second lateral wall.

4. The portable storage device of claim 3 further comprising a frame for covering the storage module, and at least one guiding slot being formed on the frame for guiding the rail of the second lateral wall.

5. The portable storage device of claim 4 wherein at least one opening is formed on the frame, and the protrusion passes through the groove on the fixture and protrudes into the opening on the frame.

6. The portable storage device of claim 4 wherein a plurality of heat-dissipating holes is formed on the frame for dissipating heat generated by the storage module.

7. The portable storage device of claim 1 wherein at least one pin is formed on the lateral plate for inserting into the hole.

8. The portable storage device of claim 1 wherein at least one aperture is formed on the lock.

9. The portable storage device of claim 1 further comprising a cover for covering the fixture and the lock mechanism.

10. A computer system comprising:
a housing;
a frame installed inside the housing; and
a portable storage device installed inside the frame in a detachable manner, the portable storage device comprising:
- a storage module whereon at least one hole is formed;
- at least one lateral plate disposed on a lateral side of the storage module, the lateral plate comprising a first lateral wall and a second lateral wall, a slot being formed on the first lateral wall, and at least one pin being formed on the lateral plate for inserting into the hole;
- a fixture disposed on a front side of the storage module, the fixture comprising at least one wedging component for wedging in the slot of the lateral plate, a dot being formed on a side of the wedging component, the dot being located inside the slot when the first lateral wall is inserted into the fixture, the dot contacting against an edge of the slot when the lateral plate is drawn out from the fixture, and at least one groove being formed on the fixture; and
- a lock mechanism disposed on a side of the fixture, the lock mechanism comprising:
  - at least one lock comprising a protrusion for protruding into the groove on the fixture; and
  - an elastic component connected to the lock for providing an elastic force to the lock so that the protrusion wedges in the groove on the fixture.

11. The computer system of claim 10 wherein the first lateral wall and the second lateral wall are substantially perpendicular.

12. The computer system of claim 10 wherein at least one rail is formed on the second lateral wall, and at least one guiding slot is formed on the frame for guiding the rail of the second lateral wall.

13. The computer system of claim 10 wherein at least one opening is formed on the frame, and the protrusion passes through the groove on the fixture and protrudes into the opening on the frame.

14. The computer system of claim 10 wherein a plurality of heat-dissipating holes is formed on the frame for dissipating heat generated by the storage module.

15. The computer system of claim 10 wherein at least one aperture is formed on the lock.

16. The computer system of claim 10 further comprising a cover for covering the fixture and the lock mechanism.

17. A portable storage device comprising:
a storage module whereon a hole is formed;
at least one lateral plate disposed on a lateral side of the storage module, a slot being formed on the lateral plate;
a fixture disposed on a front side of the storage module, the fixture comprising at least one wedging component for wedging in the slot of the lateral plate, and at least one groove being formed on the fixture; and
a lock mechanism disposed on a side of the fixture, the lock mechanism comprising:
- two locks, each lock comprising a protrusion for protruding into the groove on the fixture; and
- an elastic component connected to the two locks for providing an elastic force to the two locks, the two locks being pushed inwardly so as to compress the elastic component for separating the protrusion from the groove on the fixture, and the elastic component restoring elastically for pushing the two locks outwardly so that the protrusion is wedged in the groove on the fixture when releasing the two locks.

18. The portable storage device of claim 17 wherein the lateral plate comprises a first lateral wall and a second lateral wall, and the slot is formed on the first lateral wall.

19. The portable storage device of claim 18 wherein the first lateral wall and the second lateral wall are substantially perpendicular.

20. The portable storage device of claim 18 wherein at least one rail is formed on the second lateral wall.

21. The portable storage device of claim 20 further comprising a frame for covering the storage module, and at least one guiding slot being formed on the frame for guiding the rail of the second lateral wall.

22. The portable storage device of claim 21 wherein at least one opening is formed on the frame, and the protrusion passes through the groove on the fixture and protrudes into the opening on the frame.

23. The portable storage device of claim 21 wherein a plurality of heat-dissipating holes is formed on the frame for dissipating heat generated by the storage module.

24. The portable storage device of claim 17 wherein at least one pin is formed on the lateral plate for inserting into the hole.

25. The portable storage device of claim 17 wherein at least one aperture is formed on each lock.

26. The portable storage device of claim 17 wherein a dot is formed on a side of the wedging component, the dot is located inside the slot when the first lateral wall is inserted into the fixture, and the dot contacts against an edge of the slot when the lateral plate is drawn out from the fixture.

27. The portable storage device of claim 17 further comprising a cover for covering the fixture and the lock mechanism.

* * * * *